United States Patent
Schulz et al.

(10) Patent No.: US 10,430,313 B2
(45) Date of Patent: Oct. 1, 2019

(54) SYSTEM FOR CORRELATION OF OPERATING SYSTEM AND HARDWARE TRACE EVENTS

(71) Applicant: Intel Corporation, Santa Clara, CA (US)

(72) Inventors: Norbert Schulz, Ichenhausen (DE); Frank Penczek, Ulm (DE); Joseph E. Wylder, Granite Bay, CA (US); Eran Geva, Haifa (IL)

(73) Assignee: Intel Corporation, Santa Clara, CA (US)

( * ) Notice: Subject to any disclaimer, the term of this patent is extended or adjusted under 35 U.S.C. 154(b) by 858 days.

(21) Appl. No.: 14/864,597

(22) Filed: Sep. 24, 2015

(65) Prior Publication Data

US 2017/0091063 A1   Mar. 30, 2017

(51) Int. Cl.
   *G06F 1/00*     (2006.01)
   *G06F 11/34*    (2006.01)

(52) U.S. Cl.
   CPC .................. *G06F 11/348* (2013.01)

(58) Field of Classification Search
   None
   See application file for complete search history.

(56) References Cited

U.S. PATENT DOCUMENTS

| | | | | |
|---|---|---|---|---|
| 8,571,005 B1* | 10/2013 | Vleugels | ................... | G06F 5/16 370/350 |
| 2010/0257510 A1* | 10/2010 | Horley | ................ | G06F 11/3632 717/128 |
| 2011/0268097 A1* | 11/2011 | Agrawala | ................ | G01S 5/021 370/338 |
| 2013/0159780 A1* | 6/2013 | Bedwell | ............. | G06F 11/3466 714/45 |
| 2015/0046617 A1* | 2/2015 | Shirlen | ................... | G06F 13/36 710/117 |
| 2015/0254158 A1* | 9/2015 | Puri | .................... | G06F 11/3476 714/37 |

OTHER PUBLICATIONS

"ARMDS Development Tools", ARM DS-5 Development Studio, 2015 ARM, downloaded from ds.arm.com, on Jan. 22, 2016.
"CoreSight Debut and Trace", ARM The Architecture for the Digital World, downloaded from arm.com/products/system-ip/debug-trace, on Jan. 19, 2016.

* cited by examiner

*Primary Examiner* — Nitin C Patel
(74) *Attorney, Agent, or Firm* — Grossman, Tucker, Perreault & Pfleger, PLLC (57) ABSTRACT

Generally, this disclosure provides systems, methods and computer readable media for correlation of OS and hardware events to provide a corrected trace sequence. A system may include a processor configured to receive an OS event at a first time, generate a first timestamp based on a first clock associated with the OS, buffer the OS event until a second time, and generate a second timestamp based on the first clock. The system may also include a trace generation circuit configured to receive the OS event from the processor after the second time and generate a third timestamp based on a second clock associated with the trace generation circuit. The system may further include a trace correction circuit configured to calculate a corrected timestamp for the OS event based on differences between the first, second and third timestamps and further based on the relative frequency between the first and second clocks.

21 Claims, 7 Drawing Sheets

SYSTEM FOR CORRELATION OF OPERATING SYSTEM AND HARDWARE TRACE EVENTS

FIELD

The present disclosure relates to trace events, and more particularly, to correlation of operating system and hardware trace events.

BACKGROUND

Modern hardware platforms, for example, computing or communication systems, etc., often provide dedicated circuitry to create or collect trace data that is useful for development, debugging, testing and validation purposes. The trace may include a sequence of events that are of interest for some particular purpose. The events may be generated by hardware, firmware or software, including an operating system (OS) that executes on the platform.

These events are typically time-stamped to allow for sequential ordering within the trace. Unfortunately, when a combination of hardware events and OS events are generated, it becomes difficult to assemble a correct event ordering because the OS events are typically stored or buffered by the OS until a convenient time is available to report the results to the trace generating circuitry. The buffer time delay may be very lengthy compared to the timing and acquisition of hardware or firmware events. Additionally, the timestamp for OS events may be generated by a clock associated with the OS which is often independent of the clock used by the trace generating circuitry. This situation increases the difficulty of performing trace debug analysis in applications where the relative timing between hardware and OS events is important.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides systems, devices, methods and computer readable media for correlation of operating system (OS) and hardware (HW) events to provide a corrected sequence of events in a trace that may be used for development, test, debug, and/or other validation purposes. In some embodiments, a system may include a processor configured to receive OS or other software events and to generate OS timestamps for these events based on a clock associated with the OS. The processor may further buffer the OS events until a later time, and generate a second OS timestamp based on the OS clock, at which point the OS events are provided to a trace generation circuit. The trace generation circuit may be configured to receive the OS events from the processor (in addition to HW events from other sources) and to generate a third timestamp, a HW timestamp, based on a clock associated with the trace generation circuit. The system may further include a trace correction circuit or processor configured to calculate a corrected timestamp for the OS events based on differences between the first, second and third timestamps and further based on the relative frequency between the OS and HW clocks. The corrected timestamp may be used to correlate of OS and HW events to provide a corrected sequence of events in the trace.

Figure 1:
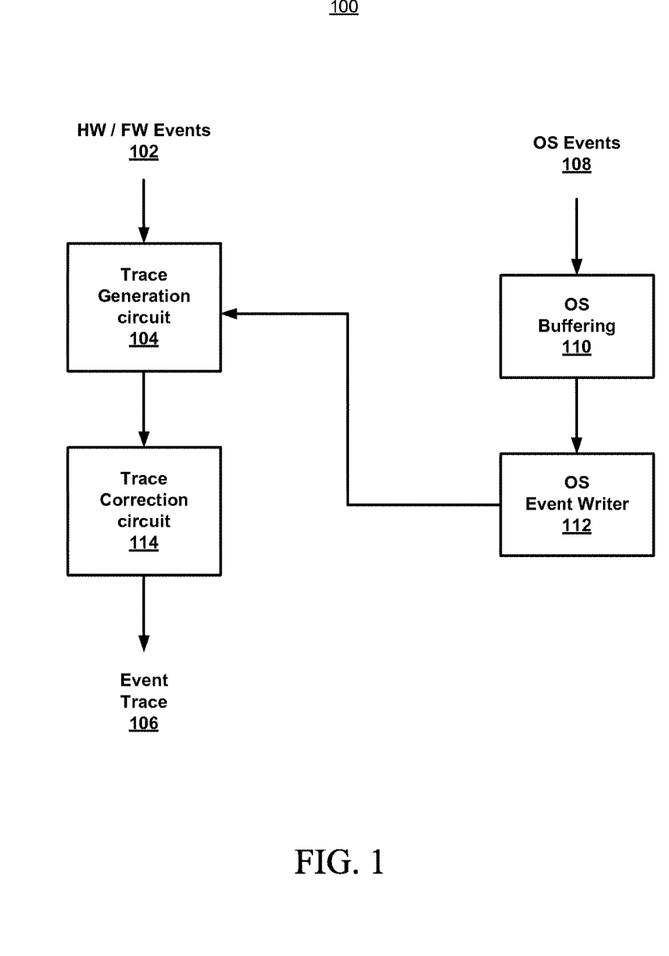
FIG. 1 illustrates a top level system diagram of an example embodiment consistent with the present disclosure.

FIG. 1 illustrates a top level system diagram 100 of one example embodiment consistent with the present disclosure. A system, such as, for example, a computing or communication platform, is shown to include a trace generation circuit 104 configured to receive events and generate an informational trace that may be used to assist with the development, test and debug of new systems or features. The events may be received from various sources including hardware (HW) and Firmware (FW) sources 102 or software sources 108. The software sources 108 may include the Operating System (OS), or other application or user software, however software events are typically channeled through the OS to the trace generation circuit 104. The software events, which will be referred to simply as OS events, may be buffered 110 by the OS until a convenient time (e.g., when processor utilization is low or idle), at which point an OS event writer 112 may transmit the stored events to the trace generation circuit 104.

All events are time stamped, and in the case of OS events, multiple timestamps may be employed, as will be described in greater detail below. Trace correction circuit (or processor) 114 may be configured to correct the timestamps of the OS events relative to other types of events to provide a corrected sequence of events in the resulting trace 106, as will be described in greater detail below.

Figure 2:
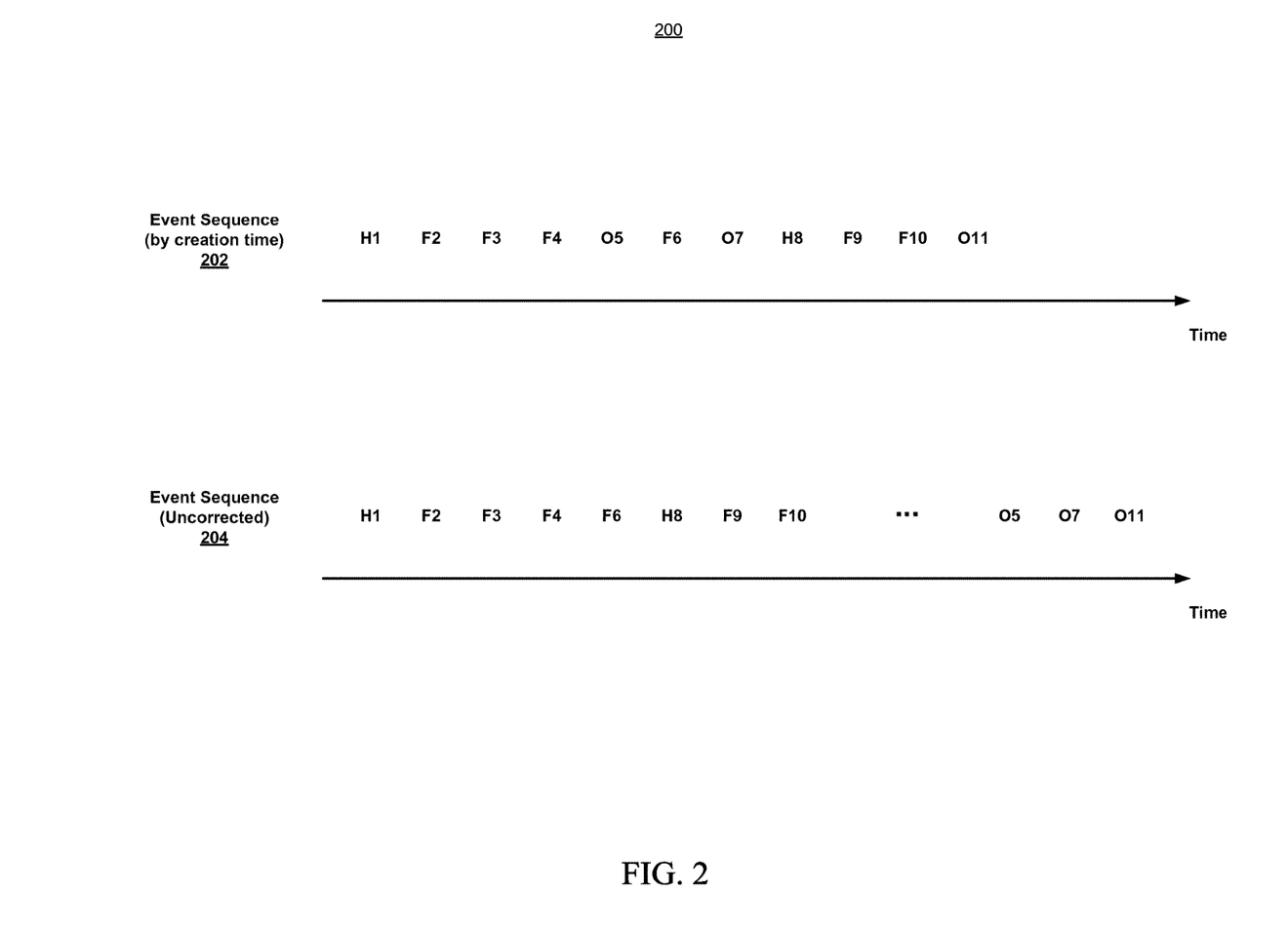
FIG. 2 illustrates event sequences consistent with one example embodiment of the present disclosure.

FIG. 2 illustrates event sequences 200 consistent with one example embodiment of the present disclosure. One example application where an event trace may be useful is debugging of touch gesture detection processing. A touch gesture may involve the user touching one or more fingers to the screen of a device to initiate some action or to wake the device from a sleep state. Various hardware, firmware and software components need to interact correctly to accomplish successful touch gesture detection and it may be necessary to debug this interaction during engineering development of the system. For example, hardware in the touch screen detects the physical touch, firmware may be executed to respond to the detection (since the OS may be sleeping in a low power mode), and the OS may be activated to process the commands associated with the touch gesture. Because the sequence of interactions occurs under real-time constraints, an event trace is a useful tool for debugging this type of operation where the timing and order of the events is an important part of the analysis.

A first event sequence 202 is illustrated where the events are shown in the actual order of event creation. For example H1 is the first HW event, followed by three FW events F2, F3 and F4, followed in turn by an OS event O5, etc. The trace based on this sequence could indicate, for example, that a touch HW event is followed by a sequence of handshakes between the FW and the OS.

The second event sequence 204, however, shows the events as they appear in the order that they are presented to the trace generation circuit 104. Here, the HW and FW events arrive well before the OS events due to the delay caused by buffering of the OS events, which may be orders of magnitude greater than the actual timing of the creation of the events. This delay makes it difficult or impossible to obtain precise time correlations between the HW, FW and OS events other than through manual and time consuming analysis by the end user of the trace.

Figure 3:
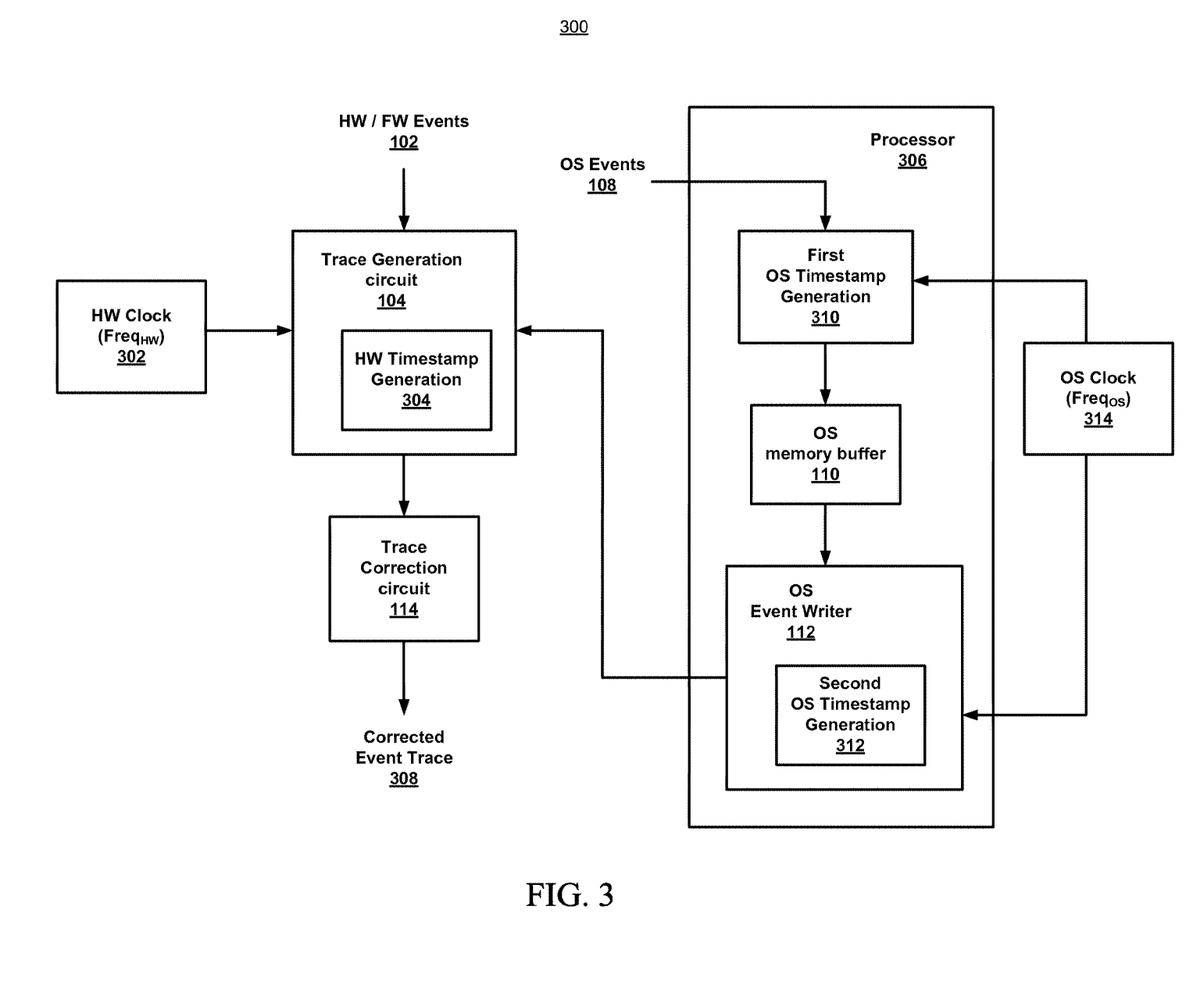
FIG. 3 illustrates a block diagram of one example embodiment consistent with the present disclosure.

FIG. 3 illustrates a block diagram 300 of one example embodiment consistent with the present disclosure. The system is shown to include a processor circuit 306 configured to host or execute an OS which may generate or collect software events, which will be referred to herein as OS events 108. The processor (or the OS executing on the processor) generates a first OS timestamp 310 to be associated with the creation of the OS event, at a first time. The OS timestamp is based on an OS clock 314 which operates at a known clock frequency ClockFreq$_{OS}$ (e.g., OS clock ticks), and which may not necessarily be synchronized with the HW clock 302 described below. The system may also include a memory buffer 110, into which the OS event is stored by the processor for retrieval at a suitable later time, for example when the processor utilization is low or idle. The processor (or an OS event writer 112 executing on the processor) retrieves the OS event from the buffer 110 at a second time and generates a second OS timestamp 312 associated with that later time. The second timestamp is also based on the OS clock 314. The OS event writer 112 then provides the event and the two timestamps to the trace generation circuit 104.

The trace generation circuit 104 may be configured to receive HW and FW events 102 from various system or device sources and to receive OS events from OS event writer 112. Trace generation circuit 104 is shown to include HW timestamp generation circuit 304 configured to generate and associate a HW timestamp with each received event (whether a HW, FW or OS event). The HW timestamp is based on a HW clock 302 which operates at a known clock frequency ClockFreq$_{HW}$, (e.g., HW clock ticks), and which may not necessarily be synchronized with the OS clock 314 described above. The trace generation circuit 104 is further configured to generate a trace that includes all of the relevant events. For HW and FW events, the HW timestamp may be sufficient to indicate the creation time of the event for correct insertion order within the generated trace. The OS events, however, may typically be delayed and out of order.

The trace correction circuit 114 may be configured to receive the generated trace and correct the order or placement of the OS events within the trace by analyzing the 3 timestamps associated with each OS event (e.g., the two OS timestamps and the HW timestamp). A corrected timestamp, $T0_{HW}$, may be computed for each OS event according to the following formula:

$$T0_{HW} = T1_{HW} - (T1_{OS} - T0_{OS}) * \frac{ClockFreq_{HW}}{ClockFreq_{OS}}$$

Where $T0_{OS}$ is the first OS timestamp, $T1_{OS}$ is the second OS timestamp, and $T1_{HW}$ is the HW timestamp generated when the OS event is received by the trace generation circuit 104. The ($T1_{OS}$–$T0_{OS}$) term represents the buffer delay imposed by the OS and the $$\frac{ClockFreq_{HW}}{ClockFreq_{OS}}$$

term corrects this delay for any frequency difference that may exist between the HW clock and the OS clock. The final difference, subtracting the corrected buffer delay from $T1_{HW}$, results in at least an approximation of $T0_{HW}$, which is the value that the HW clock would have indicated at time T0.

Using the corrected timestamps for the OS events, the trace correction circuit 114 may re-order the OS events into the trace at the proper times along with the correct time stamp indications, thus providing a corrected event trace 308 for the consumer of the trace.

Figure 4:
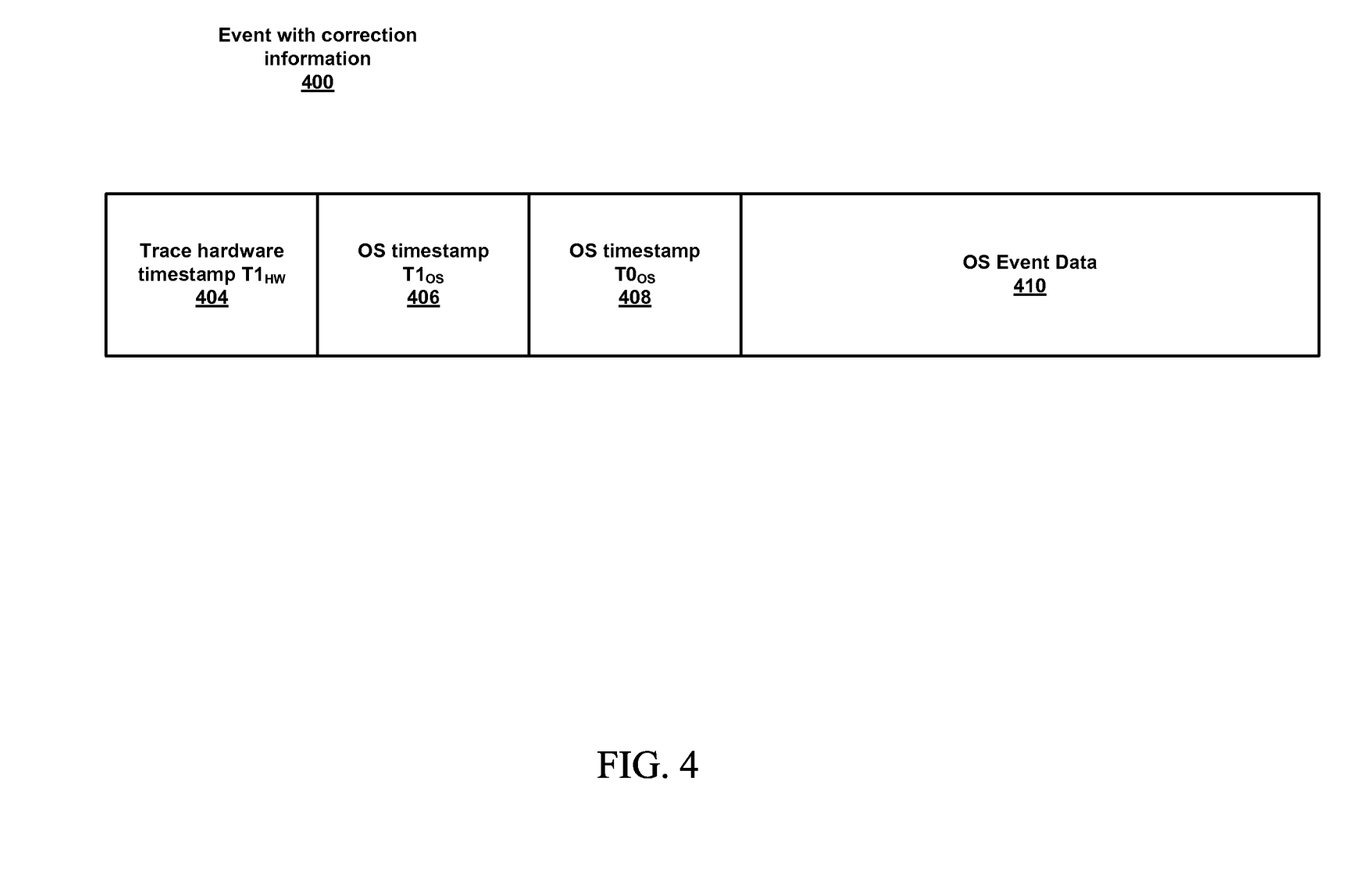
FIG. 4 illustrates fields of an event data structure consistent with one example embodiment of the present disclosure.

FIG. 4 illustrates an event data structure 400 consistent with one example embodiment of the present disclosure. The OS event data 410 is shown embedded with timing correction information in a data structure 400. The OS event data 410 contains details specific to the OS event and represents the event data payload. OS timestamps $T0_{OS}$ 408 and $T1_{OS}$ 406 are shown appended to the OS event data 410, for example by the processor 306, through the OS and OS event writer 112. HW timestamp $T1_{HW}$ 404 is also shown appended to the OS event data 410, for example by the trace generation circuit 104.

Figure 5:
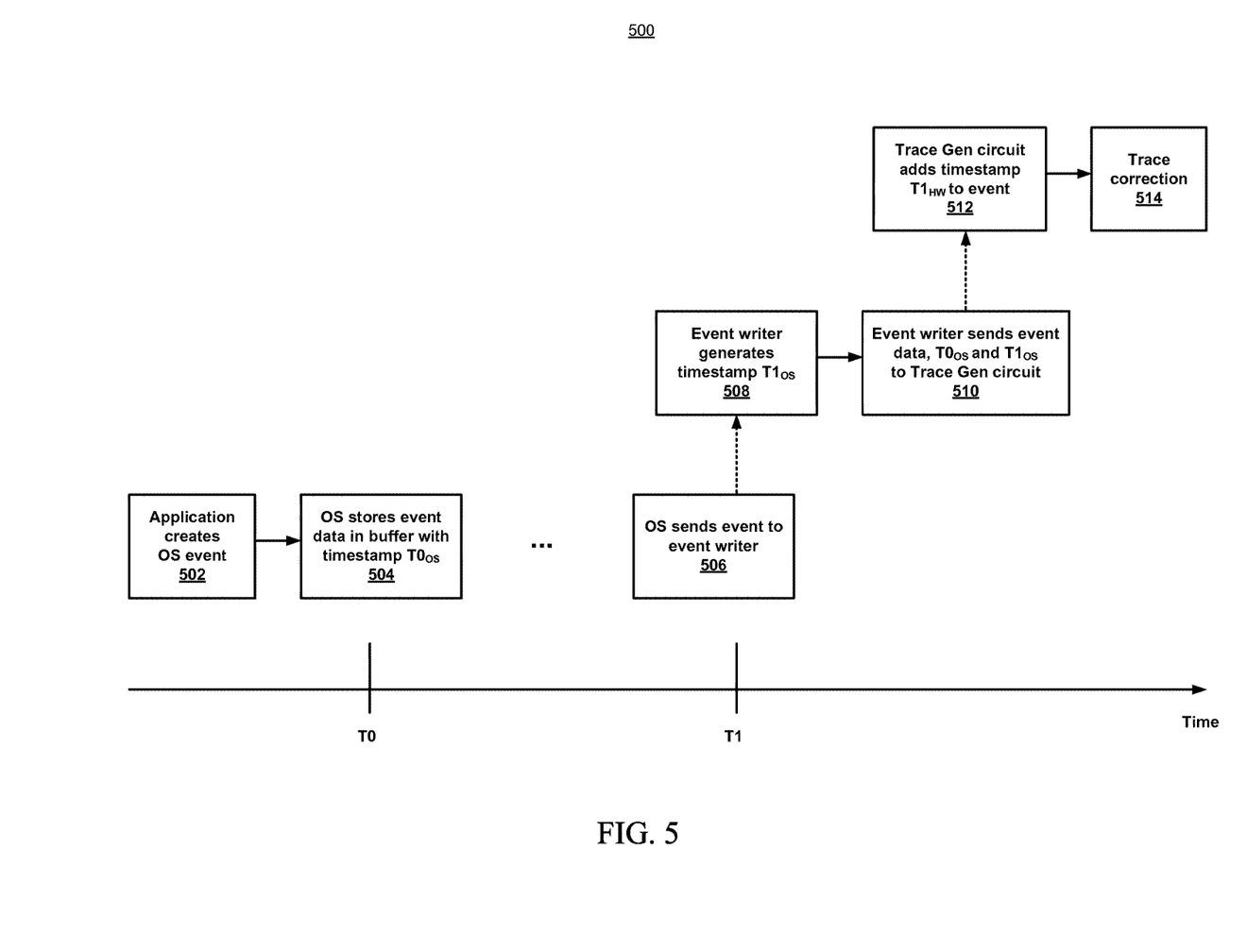
FIG. 5 illustrates a processing timeline of another example embodiment consistent with the present disclosure.

FIG. 5 illustrates a processing timeline 500 of another example embodiment consistent with the present disclosure. In this timeline, the OS or a software application creates an event at operation 502. The OS then stores the event data, which describes the details of the event, in a buffer along with a timestamp $T0_{OS}$, at operation 504. Time T0 corresponds substantially with the time that the event is created and/or stored in the buffer. At a second, later time, T1, the OS retrieves the event from the buffer and sends it to an event writer, at operation 506. The event writer, which in some embodiments may be a module, process or thread of the OS, generates a second timestamp $T1_{OS}$, at operation 508. The event writer then sends the event along with the two OS timestamps to the trace generation circuit, at operation 510. The difference between the two OS timestamps, $T0_{OS}$ and $T1_{OS}$, substantially represents the time delay, in OS clock ticks, associated with the buffer storage of the event.

At operation 512, the trace generation circuit receives the event and appends an additional HW timestamp, $T1_{HW}$, which substantially represents the time T1, but in HW clock ticks. The event, along with the three timestamps, is provided to the trace correction circuit at operation 514 where a corrected timestamp corresponding to time T0 in HW clock ticks is calculated.

Figure 6:
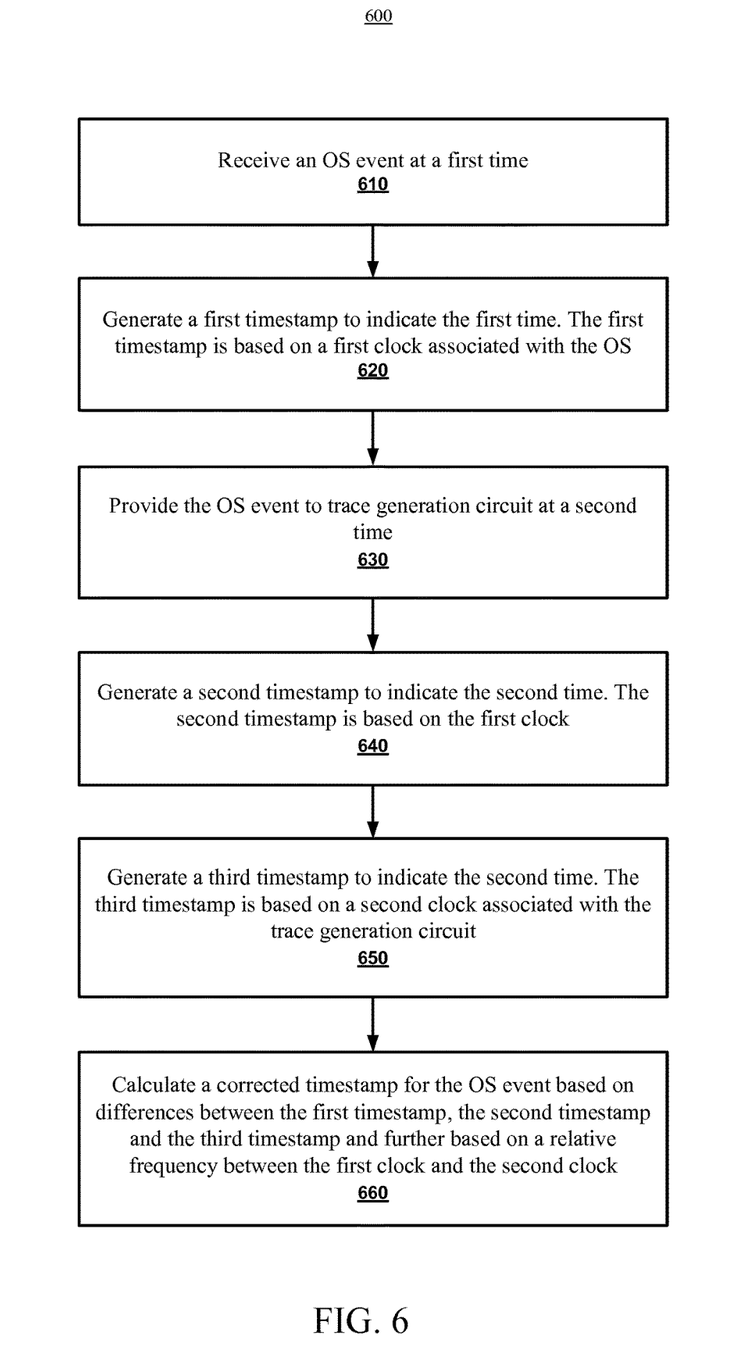
FIG. 6 illustrates a flowchart of operations of another example embodiment consistent with the present disclosure.

FIG. 6 illustrates a flowchart of operations 600 of another example embodiment consistent with the present disclosure. The operations provide a method for correlation of operating system and hardware events to provide a corrected sequence of events in a trace. At operation 610, an OS event is received at a first time. At operation 620, a first timestamp is generated to indicate the first time. The first timestamp is based on a first clock associated with the OS. At operation 630, the OS event is provided to trace the generation circuit at a second time. At operation 640, a second timestamp is generated to indicate the second time. The second timestamp is also based on the first clock. At operation 650, a third timestamp is generated to indicate the second time. The third timestamp is based on a second clock associated with the trace generation circuit. At operation 660, a corrected timestamp is calculated for the OS event based on differences between the first timestamp, the second timestamp and the third timestamp and further based on a relative frequency between the first clock and the second clock.

Figure 7:
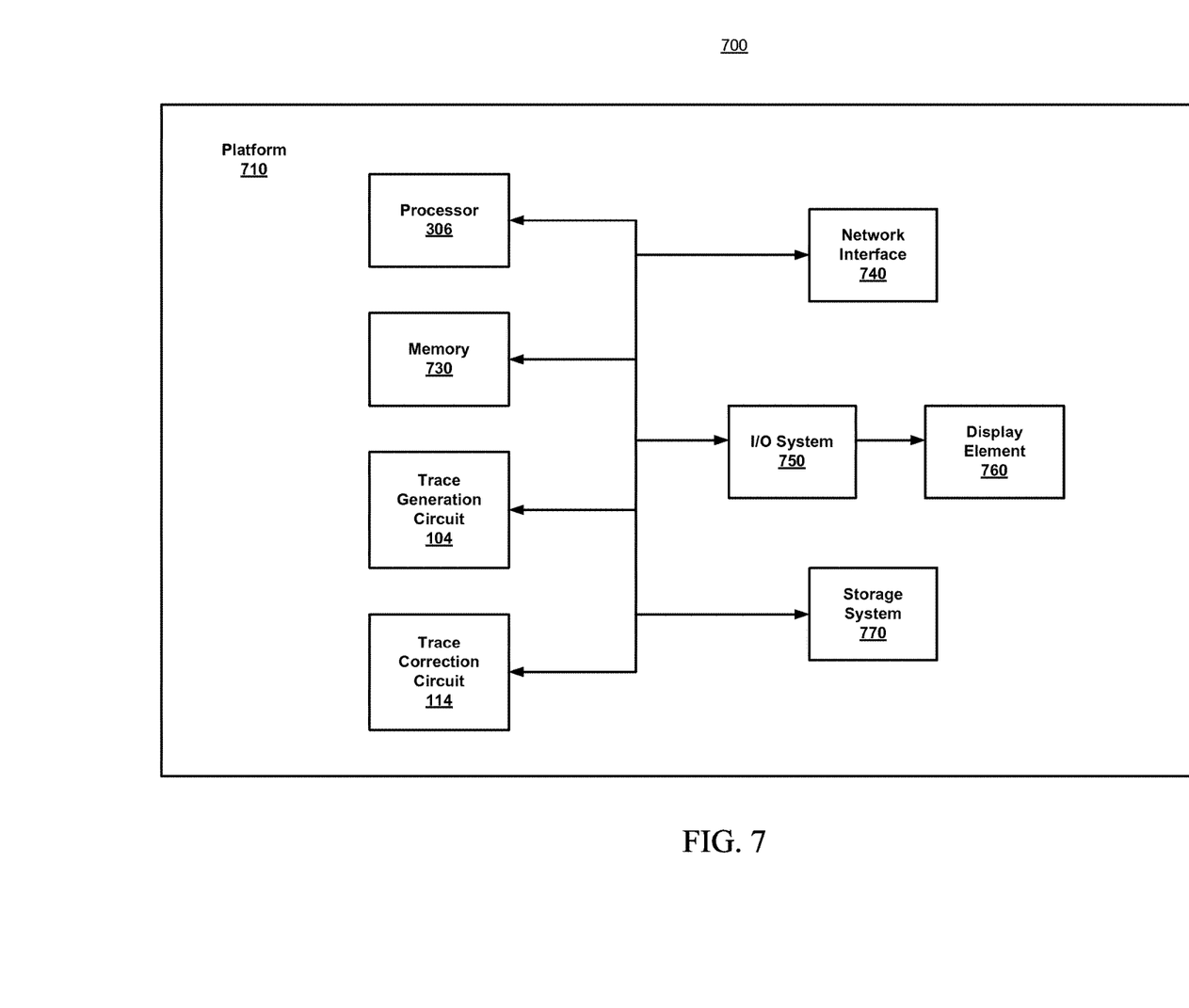
FIG. 7 illustrates a system diagram of a platform of another example embodiment consistent with the present disclosure.

FIG. 7 illustrates a system diagram 700 of one example embodiment consistent with the present disclosure. The system 700 may be a platform 710 or computing device such as, for example, a smart phone, smart tablet, personal digital assistant (PDA), mobile Internet device (MID), convertible tablet, notebook or laptop computer, workstation or desktop computer.

The system 700 is shown to include one or more processors 306 and memory 730. In some embodiments, the processors 306 may be implemented as any number of processor cores. The processor (or processor cores) may be any type of processor, such as, for example, a microprocessor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. The memory 730 may be coupled to the processors. The memory 730 may be any of a wide variety of memories (including various layers of memory hierarchy and/or memory caches) as are known or otherwise available to those of skill in the art. It will be appreciated that the processors and memory may be configured to store, host and/or execute one or more operating systems, user applications or other software. The applications may include, but not be limited to, for example, any type of computation, communication, data management, data storage and/or user interface task. In some embodiments, these applications may employ or interact with any other components of the platform 710. In some embodiments, the operating system (and/or applications and other software) may generate OS events, and any of the hardware components or devices may generate hardware events.

System 700 is also shown to include trace generation circuit 104 and trace correction circuit 114 configured to provide correlation of operating system and hardware events and to provide a corrected sequence of events in a trace, as described previously.

System 700 is also shown to include network interface circuit 740 which may include wireless communication capabilities, such as, for example, cellular communications, Wireless Fidelity (WiFi), Bluetooth®, and/or Near Field Communication (NFC). The wireless communications may conform to or otherwise be compatible with any existing or yet to be developed communication standards including past, current and future version of Bluetooth®, Wi-Fi and mobile phone communication standards.

System 700 is also shown to include an input/output (IO) system or controller 750 which may be configured to enable or manage data communication between processor 306 and other elements of system 700 or other elements (not shown) external to system 700. The system may generally present various interfaces to a user via a display element 760 such as, for example, a touch screen, liquid crystal display (LCD) or any other suitable display type. System 700 is also shown to include a storage system 770, for example an HDD or SSD, coupled to the processor 306.

It will be appreciated that in some embodiments, the various components of the system 700 may be combined in a system-on-a-chip (SoC) architecture. In some embodiments, the components may be hardware components, firmware components, software components or any suitable combination of hardware, firmware or software.

"Circuit" or "circuitry," as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., non-volatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Any of the operations described herein may be implemented in one or more storage devices having stored thereon, individually or in combination, instructions that when executed by one or more processors perform one or more operations. Also, it is intended that the operations described herein may be performed individually or in any sub-combination. Thus, not all of the operations (for example, of any of the flow charts) need to be performed, and the present disclosure expressly intends that all sub-combinations of such operations are enabled as would be understood by one of ordinary skill in the art. Also, it is intended that operations described herein may be distributed across a plurality of physical devices, such as processing structures at more than one different physical location. The storage devices may include any type of tangible device, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions.

Thus, the present disclosure provides systems, devices, methods and computer readable media for correlation of operating system and hardware events to provide a corrected sequence of events in a trace. The following examples pertain to further embodiments.

According to Example 1 there is provided a system for correcting the timestamp of operating system (OS) events in a trace. The system may include a processor circuit to: receive an OS event at a first time; generate a first timestamp to indicate the first time, where the first timestamp is based on a first clock associated with the OS; buffer the OS event until a second time; and generate a second timestamp to indicate the second time, where the second timestamp is based on the first clock. The system may also include a trace generation circuit to: receive the OS event from the processor circuit after the second time; and generate a third timestamp to indicate the second time, where the third timestamp is based on a second clock associated with the trace generation circuit. The system may further include a trace correction circuit to calculate a corrected timestamp for the OS event based on differences between the first timestamp, the second timestamp and the third timestamp and further based on a relative frequency between the first clock and the second clock.

Example 2 may include the subject matter of Example 1, and the corrected timestamp is calculated as:

$$T0_{HW} = T1_{HW} - (T1_{OS} - T0_{OS}) * \frac{ClockFreq_{HW}}{ClockFreq_{OS}},$$

where $T0_{HW}$ is the corrected timestamp; $T1_{HW}$ is the third timestamp; $T1_{OS}$ is the second timestamp; $T0_{OS}$ is the first timestamp; $ClockFreq_{HW}$ is a frequency of the second clock; and $ClockFreq_{OS}$ is a frequency of the first clock.

Example 3 may include the subject matter of Examples 1 and 2, further including a memory buffer and the processor circuit is further to store the OS event in the memory buffer between the first time and the second time.

Example 4 may include the subject matter of Examples 1-3, and the processor circuit is further to provide the second timestamp to the trace generation circuit together with the OS event.

Example 5 may include the subject matter of Examples 1-4, and the processor circuit is further to generate an OS event data structure including data associated with the OS event, the first timestamp, the second timestamp and the third timestamp.

Example 6 may include the subject matter of Examples 1-5, and the trace generation circuit is further to receive hardware (HW) events and generate timestamps associated with the HW events based on the second clock.

Example 7 may include the subject matter of Examples 1-6, and the trace correction circuit is further to order the OS events and the HW events in the trace, and the OS events are time ordered relative to the HW events based on the corrected timestamps.

According to Example 8 there is provided a method for correcting the timestamp of operating system (OS) events in a trace. The method may include: receiving an OS event at a first time; generating a first timestamp to indicate the first time, and the first timestamp is based on a first clock associated with the OS; providing the OS event to a trace generation circuit at a second time; generating a second timestamp to indicate the second time, and the second timestamp is based on the first clock; generating a third timestamp to indicate the second time, and the third timestamp is based on a second clock associated with the trace generation circuit; and calculating a corrected timestamp for the OS event based on differences between the first timestamp, the second timestamp and the third timestamp and further based on a relative frequency between the first clock and the second clock.

Example 9 may include the subject matter of Example 8, and the corrected timestamp is calculated as:

$$T0_{HW} = T1_{HW} - (T1_{OS} - T0_{OS}) * \frac{ClockFreq_{HW}}{ClockFreq_{OS}},$$

where $T0_{HW}$ is the corrected timestamp; $T1_{HW}$ is the third timestamp; $T1_{OS}$ is the second timestamp; $T0_{OS}$ is the first timestamp; $ClockFreq_{HW}$ is a frequency of the second clock; and $ClockFreq_{OS}$ is a frequency of the first clock.

Example 10 may include the subject matter of Examples 8 and 9, further including storing the OS event in a buffer between the first time and the second time.

Example 11 may include the subject matter of Examples 8-10, further including providing the second timestamp to the trace generation circuit together with the OS event.

Example 12 may include the subject matter of Examples 8-11, further including generating an OS event data structure including data associated with the OS event, the first timestamp, the second timestamp and the third timestamp.

Example 13 may include the subject matter of Examples 8-12, further including receiving hardware (HW) events and generating timestamps associated with the HW events based on the second clock.

Example 14 may include the subject matter of Examples 8-13, further including generating a trace including the OS events and the HW events, and the OS events are time ordered relative to the HW events based on the corrected timestamps.

According to Example 15 there is provided at least one computer-readable storage medium having instructions stored thereon which when executed by a processor result in the following operations for correcting the timestamp of operating system (OS) events in a trace. The operations may include: receiving an OS event at a first time; generating a first timestamp to indicate the first time, and the first timestamp is based on a first clock associated with the OS; providing the OS event to a trace generation circuit at a second time; generating a second timestamp to indicate the second time, and the second timestamp is based on the first clock; generating a third timestamp to indicate the second time, and the third timestamp is based on a second clock associated with the trace generation circuit; and calculating a corrected timestamp for the OS event based on differences between the first timestamp, the second timestamp and the third timestamp and further based on a relative frequency between the first clock and the second clock.

Example 16 may include the subject matter of Example 15, and the corrected timestamp is calculated as:

$$T0_{HW} = T1_{HW} - (T1_{OS} - T0_{OS}) * \frac{ClockFreq_{HW}}{ClockFreq_{OS}},$$

where $T0_{HW}$ is the corrected timestamp; $T1_{HW}$ is the third timestamp; $T1_{OS}$ is the second timestamp; $T0_{OS}$ is the first timestamp; ClockFreq$_{HW}$ is a frequency of the second clock; and ClockFreq$_{OS}$ is a frequency of the first clock.

Example 17 may include the subject matter of Examples 15 and 16, further including storing the OS event in a buffer between the first time and the second time.

Example 18 may include the subject matter of Examples 15-17, further including providing the second timestamp to the trace generation circuit together with the OS event.

Example 19 may include the subject matter of Examples 15-18, further including generating an OS event data structure including data associated with the OS event, the first timestamp, the second timestamp and the third timestamp.

Example 20 may include the subject matter of Examples 15-19, further including receiving hardware (HW) events and generating timestamps associated with the HW events based on the second clock.

Example 21 may include the subject matter of Examples 15-20, further including generating a trace including the OS events and the HW events, and the OS events are time ordered relative to the HW events based on the corrected timestamps.

According to Example 22 there is provided a system for correcting the timestamp of operating system (OS) events in a trace. The system may include: means for receiving an OS event at a first time; means for generating a first timestamp to indicate the first time, and the first timestamp is based on a first clock associated with the OS; means for providing the OS event to a trace generation circuit at a second time; means for generating a second timestamp to indicate the second time, and the second timestamp is based on the first clock; means for generating a third timestamp to indicate the second time, and the third timestamp is based on a second clock associated with the trace generation circuit; and means for calculating a corrected timestamp for the OS event based on differences between the first timestamp, the second timestamp and the third timestamp and further based on a relative frequency between the first clock and the second clock.

Example 23 may include the subject matter of Example 22, and the corrected timestamp is calculated as:

$$T0_{HW} = T1_{HW} - (T1_{OS} - T0_{OS}) * \frac{ClockFreq_{HW}}{ClockFreq_{OS}},$$

where T0$_{HW}$ is the corrected timestamp; T1$_{HW}$ is the third timestamp; T1$_{OS}$ is the second timestamp; T0$_{OS}$ is the first timestamp; ClockFreq$_{HW}$ is a frequency of the second clock; and ClockFreq$_{OS}$ is a frequency of the first clock.

Example 24 may include the subject matter of Examples 22 and 23, further including means for storing the OS event in a buffer between the first time and the second time.

Example 25 may include the subject matter of Examples 22-24, further including means for providing the second timestamp to the trace generation circuit together with the OS event.

Example 26 may include the subject matter of Examples 22-25, further including means for generating an OS event data structure including data associated with the OS event, the first timestamp, the second timestamp and the third timestamp.

Example 27 may include the subject matter of Examples 22-26, further including means for receiving hardware (HW) events and means for generating timestamps associated with the HW events based on the second clock.

Example 28 may include the subject matter of Examples 22-27, further including means for generating a trace including the OS events and the HW events, and the OS events are time ordered relative to the HW events based on the corrected timestamps.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A system for correcting a timestamp of operating system (OS) events in a trace, said system comprising:
    processor circuitry to:
        receive an OS event at a first time,
        generate a first timestamp based on a first clock associated with said OS to indicate said first time,
        buffer said OS event until a second time, and
        generate a second timestamp based on said first clock to indicate said second time;
    trace generation circuitry to:
        receive said OS event from said processor circuit after said second time, and
        generate a third timestamp based on a second clock associated with said trace generation circuit to indicate said second time; and
    trace correction circuitry to calculate a corrected timestamp for said OS event based on:
        a relative frequency between said first clock and said second clock,
        subtracting a difference between said first timestamp and said second timestamp from said third timestamp.

2. The system of claim 1, wherein said corrected timestamp is calculated as:

$$T0_{HW} = T1_{HW} - (T1_{OS} - T0_{OS}) * \frac{ClockFreq_{HW}}{ClockFreq_{OS}},$$

wherein
    T0$_{HW}$ is said corrected timestamp;
    T1$_{HW}$ is said third timestamp;
    T1$_{OS}$ is said second timestamp;
    T0$_{OS}$ is said first timestamp;
    ClockFreq$_{HW}$ is a frequency of said second clock; and
    ClockFreq$_{OS}$ is a frequency of said first clock.

3. The system of claim 1, further comprising a memory buffer and said processor circuit is further to store said OS event in said memory buffer between said first time and said second time.

4. The system of claim 1, wherein said processor circuit is further to provide said second timestamp to said trace generation circuit together with said OS event.

5. The system of claim 1, wherein said processor circuit is further to generate an OS event data structure comprising data associated with said OS event, said first timestamp, said second timestamp and said third timestamp.

6. The system of claim 1, wherein said trace generation circuit is further to receive hardware (HW) events and generate timestamps associated with said HW events based on said second clock.

7. The system of claim 6, wherein said trace correction circuit is further to order said OS events and said HW events in said trace, wherein said OS events are time ordered relative to said HW events based on said corrected timestamps.

8. A method for correcting a timestamp of operating system (OS) events in a trace, said method comprising:
  receiving, by processor circuitry, an OS event at a first time;
  generating, by said processor circuitry and based on a first clock associated with said OS, a first timestamp to indicate said first time;
  providing, by said processor circuitry, said OS event to a trace generation circuit at a second time;
  generating, by said processor circuitry, a second timestamp based on said first clock to indicate said second time;
  generating, by said trace generation circuit, a third timestamp based on a second clock associated with said trace generation circuit to indicate said second time; and
  calculating, via trace correction circuitry, a corrected timestamp for said OS event based on subtracting a difference between said first timestamp and said second timestamp from said third timestamp, and on a relative frequency between said first clock and said second clock.

9. The method of claim 8, wherein said corrected timestamp is calculated as:

$$T0_{HW} = T1_{HW} - (T1_{OS} - T0_{OS}) * \frac{ClockFreq_{HW}}{ClockFreq_{OS}},$$

wherein
  $T0_{HW}$ is said corrected timestamp;
  $T1_{HW}$ is said third timestamp;
  $T1_{OS}$ is said second timestamp;
  $T0_{OS}$ is said first timestamp;
  $ClockFreq_{HW}$ is a frequency of said second clock; and
  $ClockFreq_{OS}$ is a frequency of said first clock.

10. The method of claim 8, further comprising storing said OS event in a buffer between said first time and said second time.

11. The method of claim 8, further comprising providing said second timestamp to said trace generation circuit together with said OS event.

12. The method of claim 8, further comprising generating an OS event data structure comprising data associated with said OS event, said first timestamp, said second timestamp and said third timestamp.

13. The method of claim 8, further comprising receiving hardware (HW) events and generating timestamps associated with said HW events based on said second clock.

14. The method of claim 13, further comprising generating a trace comprising said OS events and said HW events, wherein said OS events are time ordered relative to said HW events based on said corrected timestamps.

15. A non-transitory computer-readable storage medium having instructions stored thereon which when executed by a processor result in the following operations for correcting a timestamp of operating system (OS) events in a trace, said operations comprising:
  receiving, by processing circuitry of the processor, an OS event at a first time;
  generating, by the processing circuitry of the processor, a first timestamp based on a first clock associated with said OS to indicate said first time;
  providing, by the processing circuitry of the processor, said OS event to a trace generation circuit at a second time;
  generating, by the processing circuitry of the processor, a second timestamp based on said first clock to indicate said second time;
  generating, by the trace generation circuit and based on a second clock associated with said trace generation circuit, a third timestamp to indicate said second time; and
  calculating, by trace correction circuitry, a corrected timestamp for said OS event based on subtracting a difference between said first timestamp and said second timestamp from said third timestamp, and on a relative frequency between said first clock and said second clock.

16. The non-transitory computer-readable storage medium of claim 15, wherein said corrected timestamp is calculated as:

$$T0_{HW} = T1_{HW} - (T1_{OS} - T0_{OS}) * \frac{ClockFreq_{HW}}{ClockFreq_{OS}},$$

wherein
  $T0_{HW}$ is said corrected timestamp;
  $T1_{HW}$ is said third timestamp;
  $T1_{OS}$ is said second timestamp;
  $T0_{OS}$ is said first timestamp;
  $ClockFreq_{HW}$ is a frequency of said second clock; and
  $ClockFreq_{OS}$ is a frequency of said first clock.

17. The non-transitory computer-readable storage medium of claim 15, further comprising storing said OS event in a buffer between said first time and said second time.

18. The non-transitory computer-readable storage medium of claim 15, further comprising providing said second timestamp to said trace generation circuit together with said OS event.

19. The non-transitory computer-readable storage medium of claim 15, further comprising generating an OS event data structure comprising data associated with said OS event, said first timestamp, said second timestamp and said third timestamp.

20. The non-transitory computer-readable storage medium of claim 15, further comprising receiving hardware (HW) events and generating timestamps associated with said HW events based on said second clock.

21. The non-transitory computer-readable storage medium of claim 20, further comprising generating a trace comprising said OS events and said HW events, wherein said OS events are time ordered relative to said HW events based on said corrected timestamps.

* * * * *